United States Patent [19]
Ottesen et al.

[11] Patent Number: 6,104,562
[45] Date of Patent: Aug. 15, 2000

[54] MULTIPLE ELEMENT TRANSDUCER FOR MAGNETIC RECORDING

[75] Inventors: Hal Hjalmar Ottesen; Gordon James Smith, both of Rochester, Minn.

[73] Assignee: International Business Machines Corporation, Armonk, N.Y.

[21] Appl. No.: 08/834,781

[22] Filed: Apr. 3, 1997

[51] Int. Cl.[7] ................................................. G11B 15/12
[52] U.S. Cl. ............................ 360/63; 360/75; 360/316
[58] Field of Search ................................. 360/113, 119, 360/121, 123, 124, 75, 77.02, 77.08, 316, 63, 78.14

[56] References Cited

U.S. PATENT DOCUMENTS

| | | | |
|---|---|---|---|
| 4,012,781 | 3/1977 | Lin | 360/113 |
| 4,575,775 | 3/1986 | Albrecht | 360/77 |
| 4,701,815 | 10/1987 | Yada et al. | 360/77 |
| 4,729,048 | 3/1988 | Imakoshi et al. | 360/103 |
| 5,155,643 | 10/1992 | Jones, Jr. et al. | 360/113 |
| 5,218,497 | 6/1993 | Tanabe et al. | 360/113 |
| 5,245,487 | 9/1993 | Cunningham | 360/77.01 |
| 5,335,127 | 8/1994 | Nagata et al. | 360/113 |
| 5,388,014 | 2/1995 | Brug et al. | 360/113 X |
| 5,412,518 | 5/1995 | Christner et al. | 360/66 |
| 5,436,773 | 7/1995 | Hanson | 360/66 |
| 5,493,466 | 2/1996 | Suyama | 360/113 |
| 5,552,950 | 9/1996 | Coffey et al. | 360/113 X |
| 5,566,296 | 10/1996 | Ohmori et al. | 360/55 X |
| 5,629,682 | 5/1997 | Hylton et al. | 360/113 X |
| 5,754,354 | 5/1998 | Tomita et al. | 360/113 X |

FOREIGN PATENT DOCUMENTS

| | | |
|---|---|---|
| 0251413 | 10/1989 | Japan . |
| 0073478 | 3/1991 | Japan . |
| 4205808 | 7/1992 | Japan . |
| 405028427 | 2/1993 | Japan . |

OTHER PUBLICATIONS

IBM Technical Disclosure Bulletin, vol. 20, No. 9, pp. 3673–3674, Feb. 1978, "Read/Write Servo Magnetic Head," D. R. McEfee.

IBM Technical Disclosure Bulletin, vol. 24, No. 10, p. 4914, Mar. 1982, "Combined Servo and Data Head on Common Slider," S. K. Decker et al.

IBM Technical Disclosure Bulletin, vol. 26, No. 2, pp. 850–852, Jul. 1983, "Quadrature Servo Generation with Side–by–Side Data Heads," D. M. Jones.

Research Disclosure 29374, Sep. 1988, "Magnetic Recording Head with Servo Elements for Concentric Discrete Track Media."

IEEE Transactions on Magnetics, vol. Mag–17, No. 6, pp. 2739–2741, Nov. 1981, "A 2,000 Track/Inch Disk File Servo System Using a Magnetoresistive Head," R. L. Comstock et al.

*Primary Examiner*—Andrew L. Sniezek
*Attorney, Agent, or Firm*—Roy W. Truelson

[57] ABSTRACT

In a rotating magnetic disk storage device which uses an imbedded servo pattern for positioning an actuator, each transducer head comprises two magnetoresistive read elements, the read elements being separated by an insulating layer. The read elements are of different widths, the narrower element being used to read data, and the wider element being used to read servo patterns which locate the track centerline. The read elements are preferably deposited in layers on the rear of the slider body, with a thin-film inductive write head deposited in layers over the read elements. Preferably, the read elements are connected to three lead wires: a common ground lead, and separate sense leads. The sense amplification electronics alternatively sense resistance changes in one element or the other as the head passes over data or servo patterns. Because the narrow read element is used for reading data, noise due to reading too close to the edge of the track can be reduced. Because the wide element is used for reading the track centerline servo pattern, the full pattern width can be read and the transducer positioned more accurately.

19 Claims, 10 Drawing Sheets

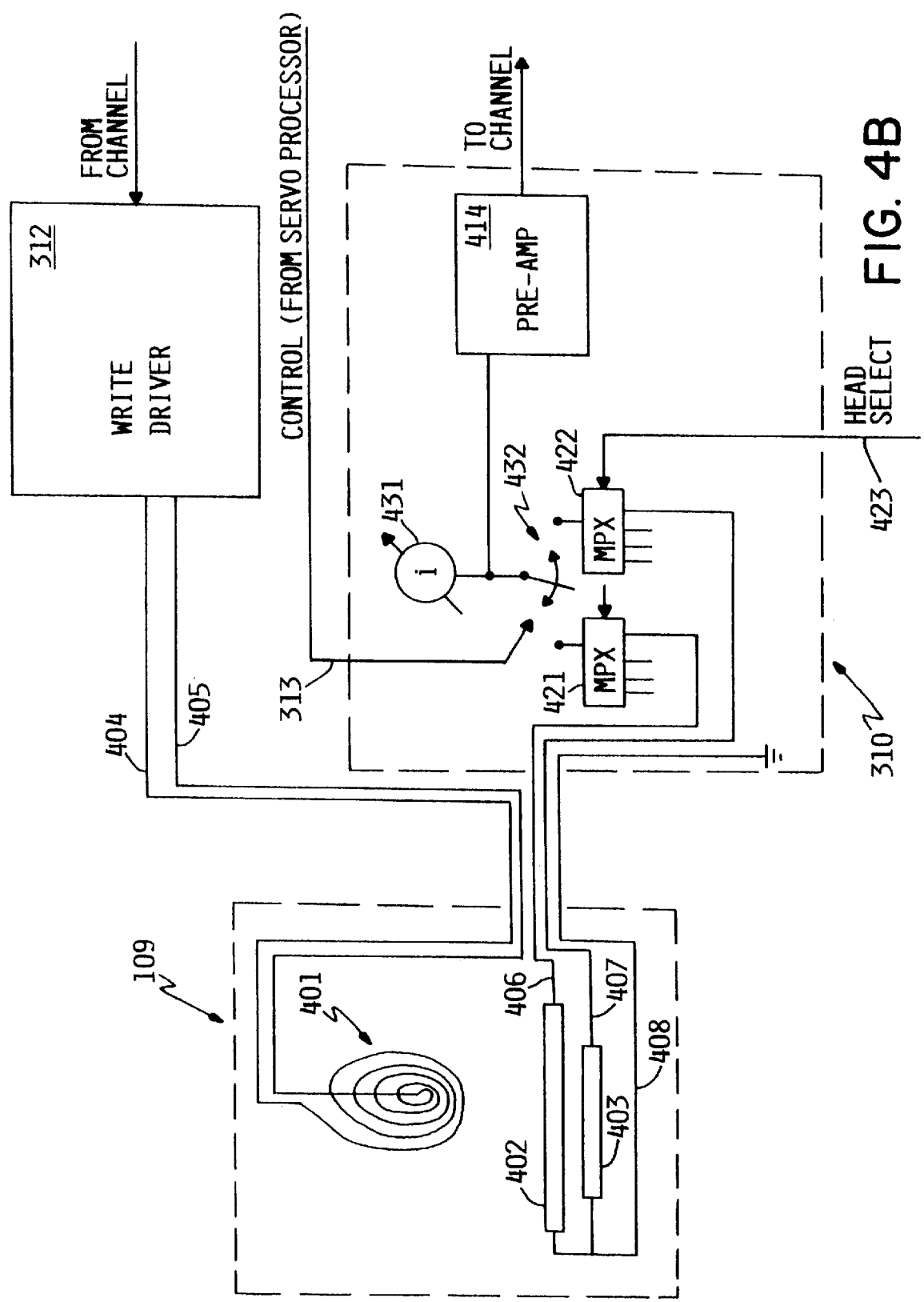

MULTIPLE ELEMENT TRANSDUCER FOR MAGNETIC RECORDING

FIELD OF THE INVENTION

The present invention relates to magnetic data storage devices, and in particular to magnetoresistive transducers used therein for detecting patterns written on a magnetic medium.

BACKGROUND OF THE INVENTION

The extensive data storage needs of modem computer systems require large capacity mass data storage devices. A common storage device is the rotating magnetic hard disk drive.

A disk drive typically contains one or more smooth, flat disks which are rigidly attached to a common spindle. The disks are stacked on the spindle parallel to each other and spaced apart so that they do not touch. The disks and spindle are rotated in unison at a constant speed by a spindle motor.

Each disk is formed of a solid disk-shaped base or substrate, having a hole in the middle for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disks in the magnetizable layer. To do this, minute magnetized patterns representing the data are formed in the magnetizable layer. The data patterns are usually arranged in circular concentric tracks. Each track is further divided into a number of sectors. Each sector thus forms an arc, all the sectors of a track completing a circle.

A moveable actuator positions a transducer head adjacent the data on the surface to read or write data. The actuator may be likened to the tone arm of a phonograph player, and the head to the playing needle. There is one transducer head for each disk surface containing data. The actuator usually pivots about an axis to position the head. It typically includes a solid block near the axis having comb-like arms extending toward the disk, a set of thin suspensions attached to the arms, and an electro-magnetic motor on the opposite side of the axis. The transducer heads are attached to the suspensions, one head for each suspension. The actuator motor rotates the actuator to position the head over a desired data track. Once the head is positioned over the track, the constant rotation of the disk will eventually bring the desired sector adjacent the head, and the data can then be read or written.

Typically, a servo feedback system is used to position the actuator. Servo patterns identifying the data tracks are written on at least one disk surface. The transducer periodically reads the servo pattern to determine its current radial position, and the feedback system adjusts the position of the actuator as required. Older disk drive designs often employed a dedicated disk surface for servo patterns. Newer designs typically use embedded servo patterns, i.e., servo patterns are recorded at angularly spaced portions of each disk surface, the area between servo patterns being used for recording data. The servo pattern typically comprises a synchronization portion, a track identifying portion for identifying a track number, and a track centering portion for locating the centerline of the track.

The transducer head is an aerodynamically shaped block of material (usually ceramic) on which is mounted a magnetic read/write transducer. The block, or slider, flies above the surface of the disk at an extremely small distance as the disk rotates. The close proximity to the disk surface is critical in enabling the transducer to read from or write the data patterns in the magnetizable layer. Several different transducer designs are used, and in some cases the read transducer is separate from the write transducer.

As computer systems have become more powerful, faster, and more reliable, there has been a corresponding increase in demand for improved storage devices. A key constraint in the design of disk drives is the data density of the disk surface, i.e., the number of units of information that can be stored on a given unit of area of disk surface. In recent years, dramatic increases in data density have made it possible to increase the amount of data stored on disk drives and at the same time reduce the physical size of drives (which tends to reduce cost, increase speed, and lower the amount of power consumed). Continued progress in the art demands further increases in data density.

The maximum data density may be limited by numerous factors. For example: the magnetic characteristics of the disk surface may limit the capacity to record data; the smoothness of the disk surface and aerodynamic characteristics of the head may limit the proximity of the transducer to the surface, thus limiting its ability to read data from and write data to the disk; the amplification electronics may have limited sensitivity; or noise generated by other components may limit what can be read or written. But one of the key determinants of data density is the design of the transducer itself.

Older disk drive designs typically employed a single read/write "inductive" transducing element having an electrical conductor winding around a magnetically permeable material. Data was written by driving a current through the conductor coil to create a magnetic field, causing a residual magnetic pattern representing data to be placed on the disk surface. Data was read by passing the transducer over the disk surface and sensing an electric current induced in the conductor coil by the moving magnetic field. This type of transducer was used extensively for many years, and is still employed in some disk drive designs. However, as data densities and rotational velocities increase, it becomes increasingly difficult to read data using an inductive transducer. I.e., increasing density means that the magnetic patterns used to induce current in the transducer become smaller, while increased rotational velocities increase the frequency of the response, thus requiring faster and more sensitive read amplification electronics to detect the minute induced current. Additionally, smaller diameter disks have lower linear velocities, which reduce the output of an inductive read element.

As a result of the limitations inherent in inductive transducing elements, many disk drives now employ a magnetoresistive transducer design. Typically, a magnetoresistive transducer design employs a dual-element transducer having a conventional inductive element for writing data only, and a magnetoresistive element for reading data. The magnetoresistive read element exploits the fact that certain materials change electrical resistance in the presence of a magnetic field (which is known as the magnetoresistive effect). By passing a small bias current through such an element, the changes in resistance can be measured as the element passes over the tiny magnetic patterns on the disk surface.

The advantage of the magnetoresistive read element over the older inductive read element is that the magnetoresistive element is far more sensitive to small magnetic variations, enabling it to read more dense data patterns. However, such read elements have peculiar characteristics of their own, which must be taken into account if further improvements are to be made in data density.

The radial distance between the centerlines of adjacent tracks is referred to as the track pitch. When writing or reading data in a disk storage device, it is important to position the transducer accurately with respect to the track centerline. If the transducer is improperly positioned when writing data, data will be written off-center, making subsequent reads of the data difficult, and possibly corrupting data in an adjacent track. If the transducer is improperly positioned when reading data, the data read may be corrupted. The accuracy with which the servo feedback system can position the transducer ultimately affects the minimum possible track pitch and hence the data density.

A typical inductive write element is slightly narrower than the track pitch to avoid interference with adjacent tracks (approximately 80–90% of the track pitch). Typically, a magnetoresistive read element has an asymmetrical sensitivity. I.e., on one side of the element, the response of the element to a magnetic field tapers off more gradually than on the other side. In order to avoid noise that would result from reading magnetic patterns at the fringes of a track, the magnetoresistive read element is typically narrower still than the write element. Usually, the read element is approximately 60% as wide as the track pitch. Notwithstanding the narrowness of the read element, it is more than adequately sensitive to read the magnetic patterns on the disk surface, provided that it is centered over the track. However, the reduced read element width causes problems when reading servo patterns, particularly, servo patterns which locate the track centerline. The problem is not one of lack of sensitivity of the element, but one of simple geometry. A conventional servo pattern optimally reveals misalignment of the head with the track when the read element is approximately as wide as the fall track pitch, and thus able to span the full servo pattern. In the case of a magnetoresistive read element, this problem is aggravated by the asymmetrical response characteristic.

In response to this condition, it is known to use servo patterns having a finer resolution, thus enabling more accurate positioning with the narrower read element. While this works well in theory, it can be difficult and costly to manufacture the drive, and additional problems may be introduced.

An alternative approach is proposed in Japanese patent publication JA-4-205808 (1992). Using this approach, more than two leads are attached to a single magnetoresistive read element. A pair of leads separated by a distance d is used for reading data, while a different pair (which may or may not include a common lead) separated by a distance d', greater than d, is used for reading the servo pattern. In this manner, the width of magnetoresistive element used for the servo pattern can be wider than that used for data.

However, JA-4-205808 fails to recognize the distortion caused by additional leads in the magnetoresistive element. When reading a servo pattern, it is expected that only a portion of the element may be directly over the pattern. Proper interpretation of the position of the element requires the electronics to determine which percentage of the element is over the pattern, and for this purpose the element should ideally have a uniform response characteristic across its entire length. The leads which are used for reading data represent discontinuities in the response characteristic of the element when reading the servo pattern, making it difficult to accurately determine the position of the element with respect to the servo pattern.

It is desirable to further improve the tracking accuracy of a disk drive using magnetoresistive head technology without the aforementioned disadvantages.

SUMMARY OF THE INVENTION

It is therefore an object of the present invention to provide an enhanced disk drive storage apparatus.

Another object of this invention is to provide an enhanced data transducer for a disk drive storage apparatus.

Another object of this invention is to increase the positioning accuracy of an actuator of a disk drive storage device.

Another object of this invention is to increase the density of data stored on a disk drive storage device.

A data transducer head for magnetically recorded data comprises two magnetoresistive read elements, the read elements being separated by an insulating layer. The read elements are of different widths, the narrower read element being used to read data, and the wider read element being used to read certain servo patterns, particularly servo patterns which locate a data track centerline.

The data transducer head is preferably used for accessing data in a rotating magnetic hard disk storage device. The disk storage device comprises one or more rotating disks for storing data, a movable actuator for supporting one or more data transducers, and a servo feedback system which reads embedded servo patterns on each disk surface to position the actuator.

The read elements are preferably deposited as a series of successive layers on the rear of an aerodynamic slider body, with a thin-film inductive read head deposited in layers over the read elements. Preferably, the read elements are connected to three lead wires: a common lead wire being connected to one end of each of the two elements, and two separate lead wires being connected respectively to the other end of each respective element. The sense amplification electronics are coupled to switches which alternatively sense resistance changes in one element or the other as the head passes over data or servo patterns.

Because the narrow read element is used for reading data, noise due to reading too close to the edge of the track can be reduced. Because the wide element is used for reading the track centerline servo pattern, the fill pattern width can be read and the transducer positioned more accurately.

BRIEF DESCRIPTION OF THE DRAWINGS

FIGS. 4B and 4C show in greater detail a portion of the electronic connections to the magnetoresistive transducer head and amplifier circuit, according to two alternative embodiments.

DETAILED DESCRIPTION OF THE PREFERRED EMBODIMENT

Figure 1:
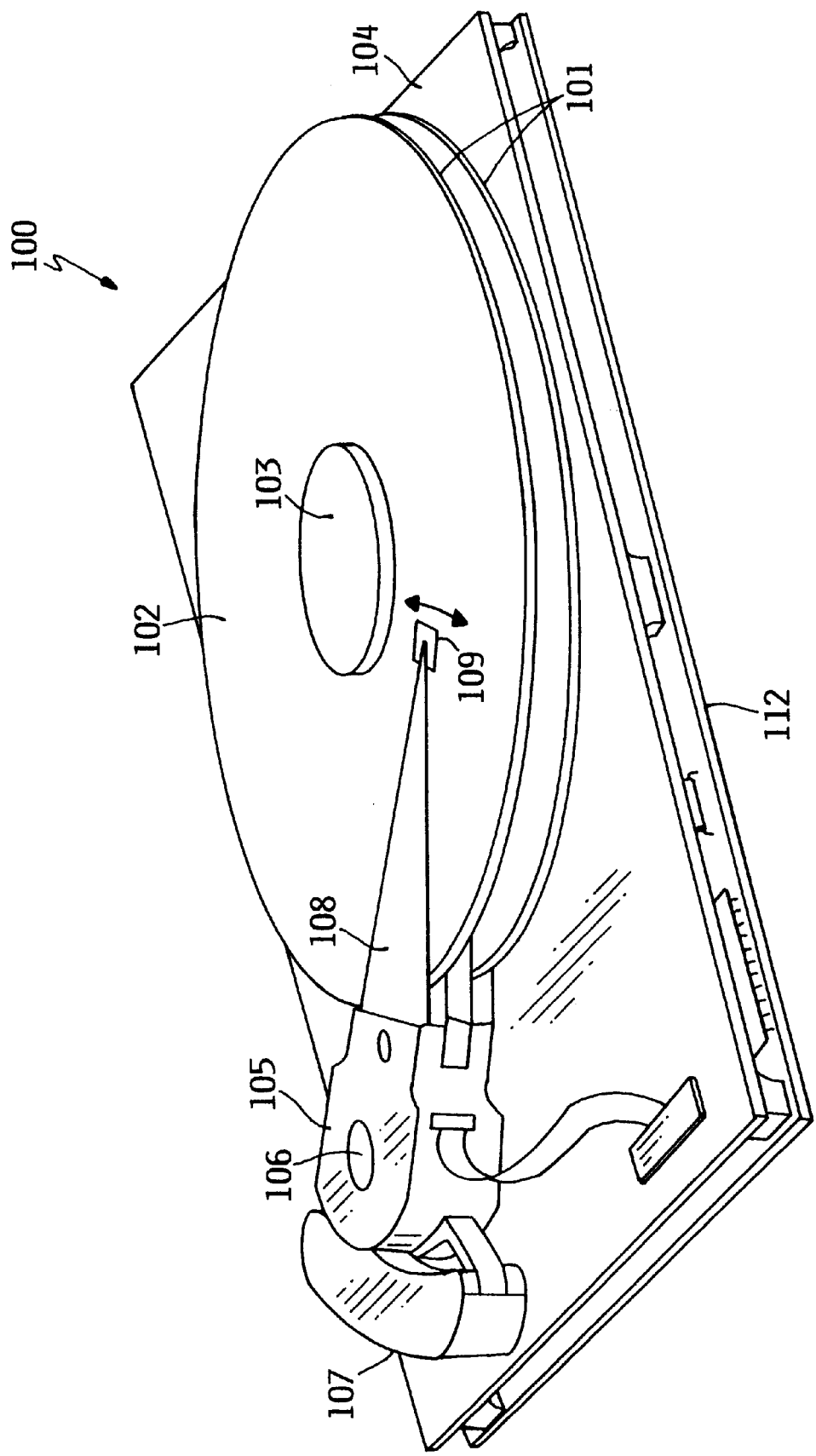
FIG. 1 shows a magnetic hard disk drive storage unit according to the preferred embodiment.

FIG. 1 shows a magnetic disk drive storage unit 100 in accordance with the preferred embodiment. Disk unit 100 comprises rotatable disks 101, which are rigidly attached to hub assembly or spindle 103, which is mounted on disk drive base or housing 104. Spindle 103 and disks 101 are driven by a drive motor at a constant rotational velocity. The drive motor (not visible) is contained within hub assembly 103. Data is recorded on the top and bottom surfaces 102 of each disk. Actuator assembly 105 is situated to one side of disks 101. Actuator 105 rotates through an arc about shaft 106 parallel to the axis of the spindle, driven by electromagnetic motor 107, to position the transducer heads. A cover (not shown) mates with base 104 to enclose and protect the disk and actuator assemblies. Electronic modules for controlling the operation of the drive and communicating with another device, such as a host computer, are mounted on a circuit card 112. In this embodiment, circuit card 112 is shown mounted outside the enclosure formed by base 104 and the cover. However, the card 112 could also be mounted inside the head/disk enclosure, or a portion of the electronics may be mounted inside the enclosure, while another portion is mounted outside the enclosure. A plurality of head/suspension assemblies 108 are rigidly attached to the prongs of actuator 105. An aerodynamic read/write transducer head 109 is located at the end of each head/suspension assembly 108 adjacent disk surface 102.

While disk drive 100 is shown with two disks having multiple disk surfaces for recording, it should be understood that the present invention could utilize a drive having a single disk, or having a larger number of disks, and that it would be possible to employ only a single disk surface of a disk for recording data.

Figure 2:
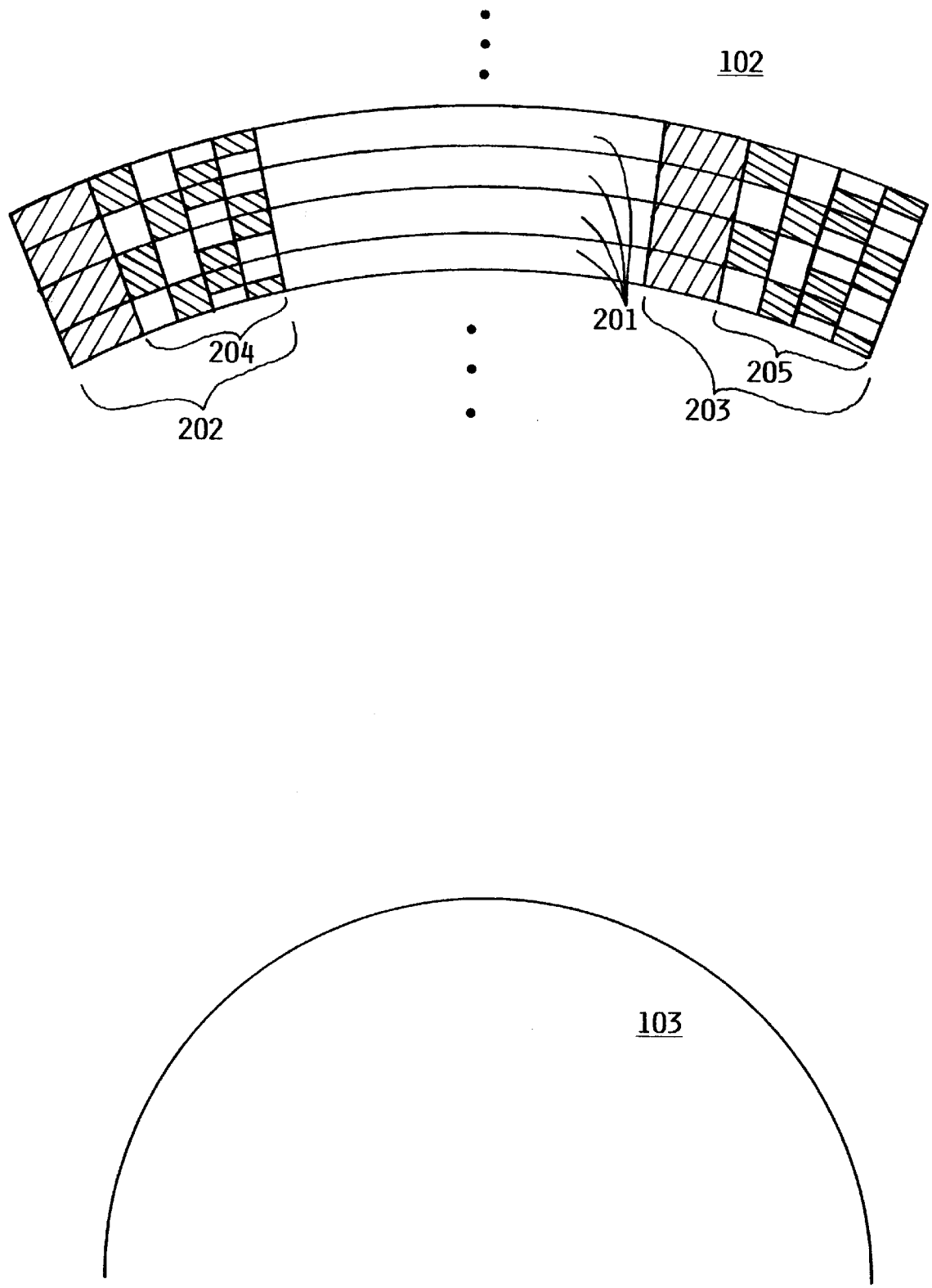
FIG. 2 depicts a portion of the disk surface of a magnetic disk drive storage unit according to the preferred embodiment.

FIG. 2 depicts in greater detail a portion of a disk surface 102 in accordance with the preferred embodiment. Disk surface 102 is formatted to contain a plurality of concentric tracks 201 for recording data. Each track contains angularly spaced embedded servo sectors 202, 203. A portion of each respective servo sector contains a track centering pattern 204, 205 used by the servo system to determine the offset of the transducer head from track center. Servo sectors 202, 203 extend in a generally radial direction across the surface of disk 101. Between servo sectors, data is magnetically encoded on tracks 201. It will be understood that the sizes and proportions of tracks, servo sectors, and disk curvature are greatly exaggerated in FIG. 2 for illustrative purposes. It will be further understood that where a rotary actuator is used as shown in FIG. 1, servo sectors typically do not extend in a perfect radius, but are bounded instead by an arc defined by the rotary actuator. In fact, a typical disk using current technology is 3.5 inches in diameter, contains approximately 6000 tracks per radial inch of disk surface, and contains approximately 80 angularly spaced servo sectors. It is expected that as technological advancements make increased data density possible, these illustrative specifications may change. The present invention should not be taken to be limited to any particular specification. Furthermore, tracks need not be formatted concentrically, but may also be formatted in a spiral pattern.

Figure 3:
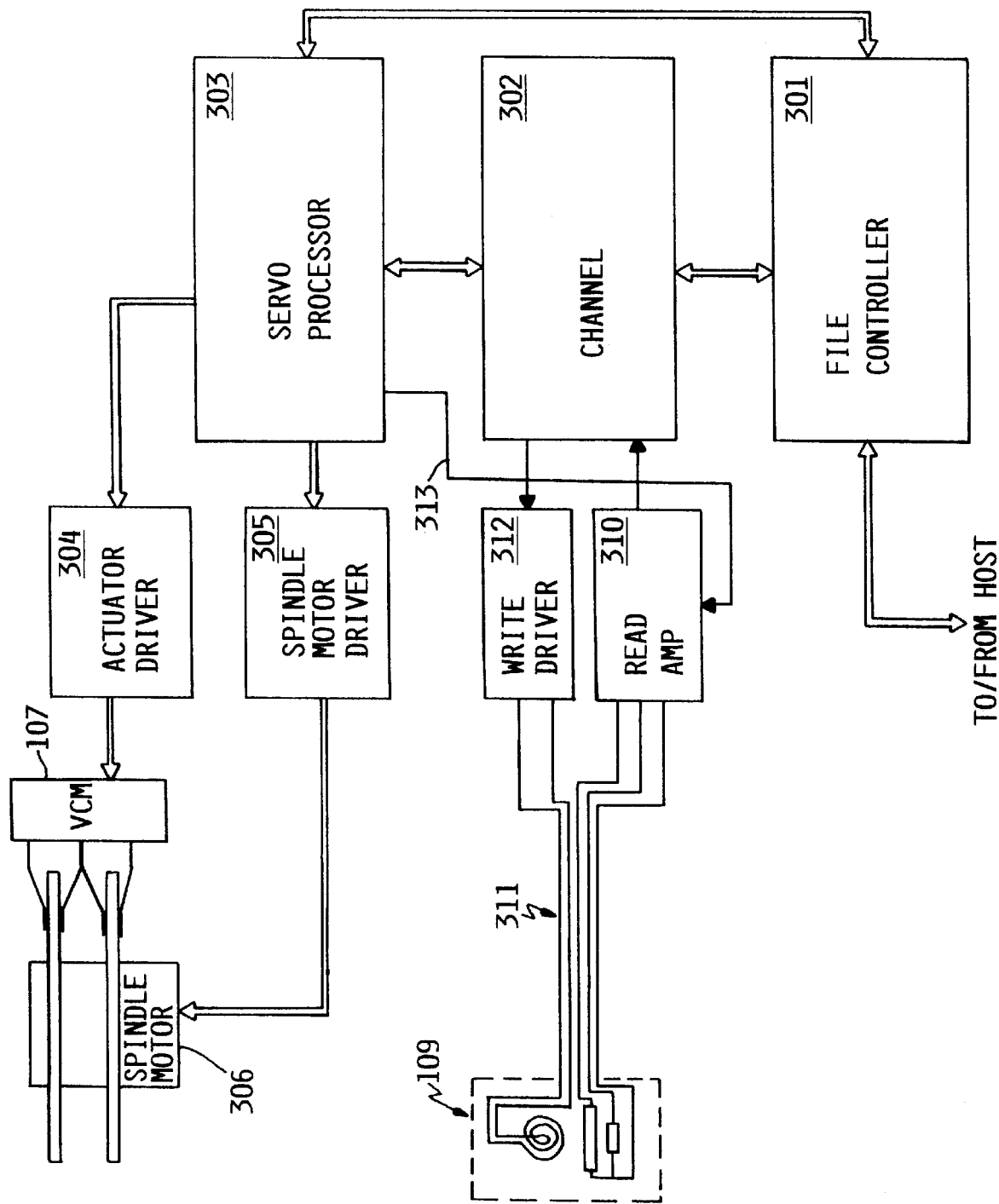
FIG. 3 is a high-level diagram of certain electronic elements of disk drive 100, according to the preferred embodiment.

FIG. 3 is a high-level diagram of certain electronic elements of disk drive 100, showing how these are connected to the transducer head, actuator motor and spindle motor, according to the preferred embodiment. File controller 301 provides a data interface to a host such as a computer system. Controller 301 also provides general control of the operation of disk drive 100, including such functions as command interpretation, sector mapping, power-up routines, diagnostics and error recovery etc. Channel electronics 302 provides modulation and demodulation function for data being written to and read from the disk surface. Servo processor 303 interprets servo signals obtained from reading servo patterns on the disk to control the actuator and spindle motors; it also responds to seek signals from file controller 301. Servo processor 303 determines the necessary parameters for actuator motor and spindle motor, and provides these as inputs to actuator motor driver circuitry 304 and spindle motor drive circuitry 305. Actuator motor drive circuitry 304 in turn provides drive current to actuator voice coil motor (VCM) 107, positioning actuator 105 to a desired location. Spindle motor drive circuitry 305 provides drive current to spindle motor 306, driving the motor at a desired rotational velocity.

Transducer head 109 is attached via lead wires 311 to write driver 312 and to read amplifier 310. Read amp 310 provides input to channel electronics 302. Channel electronics 302 provides input to write driver 312. Magnetic patterns representing data or servo signals are sensed by magnetoresistive read elements in transducer 109, amplified by read amp 310, and provided to channel electronics 302. Channel electronics preferably includes a partial-response maximum likelihood (PRML) filter for decoding data signals into coherent data for use by a host system. When writing data, channel electronics 302 encodes data according to a predetermined encoding format, and provides this data to write driver 312, which in turn drives current through an inductive write element to cause the data to be written on the disk surface.

Positioning of transducer head 109 is achieved by a servo feedback loop system comprising head 109, read amp 310, channel electronics 302, servo processor 303, actuator driver 304, and actuator motor 107. When disk drive 100 is operating in a track following mode (i.e., actuator is positioned to remain centered on a data track for reading or writing of data), head 109 senses track centering embedded servo patterns 204, 205, which are recorded on the surface of disk 101 at periodic intervals. The sensed signal is amplified by read amp 310 and input to channel electronics 302. Channel electronics 302 converts the pattern to a position error signal representing an amount of position error, i.e., the amount by which transducer head 109 deviates from track center. Servo processor 303 interprets the position error signal to determine an amount of drive current which must be supplied to actuator motor 107 in order to correct any deviation of head 109 from track center, and supplies this input to actuator driver 304. In determining the amount of drive current necessary, servo processor 303 may use other parameters as well, such as calibrated offsets between a magnetoresistive read element and a write element. Preferably, an appropriate adjustment is made for radial offset between the various elements, as explained in commonly owned copending U.S. patent application Ser. No. 08/392,276 to Dana H. Brown et al., filed Feb. 22, 1995, herein incorporated by reference. Driver 304 generates the necessary drive current, which is supplied to motor 107, thus repositioning actuator 105. Servo processor 303 further provides a feedback control signal 313 to read amp 310 for use in switching between different read elements, as described more fully below.

Figure 4A:
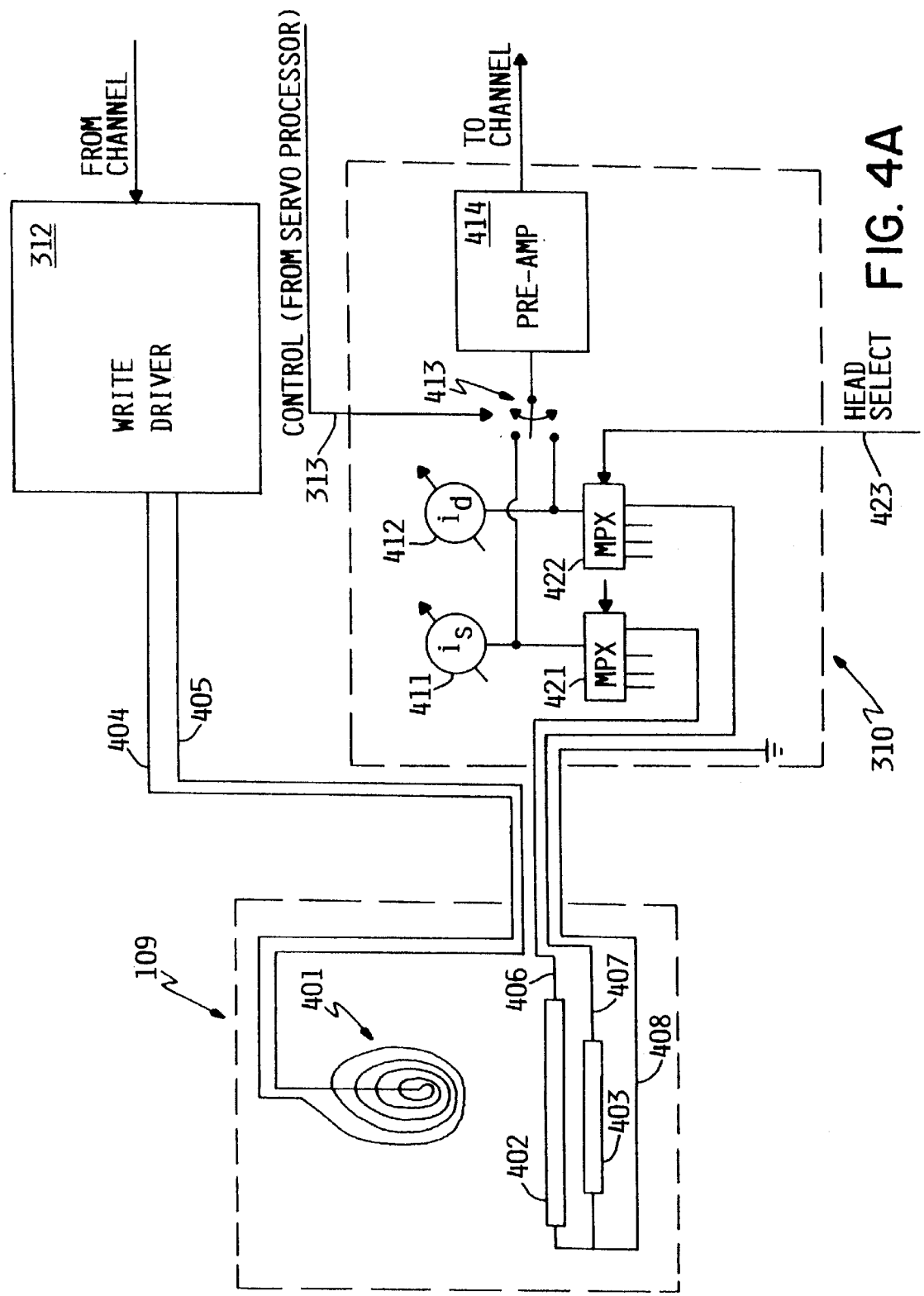
FIG. 4A shows in greater detail a portion of the electronic connections to the magnetoresistive transducer head and amplifier circuit, according to the preferred embodiment.

FIG. 4A shows in greater detail a portion of the electronic connections to the magnetoresistive transducer head and read amp circuit, according to the preferred embodiment. As shown in FIG. 4A, transducer head 109 comprises inductive windings 401 and two elements 402, 403. Inductive winding is connected via lead wires 404, 405 to write driver 312. Magnetoresistive elements 402, 403, are connected at one end thereof via respective lead wires 406, 407 to read amplifier circuit 310. The other ends of elements 402, 403 are connected to common lead wire 408, which is connected to ground.

Lead wires 406, 407 are connected through respective multiplexers 421, 422 to respective variable bias current drivers 411, 412. A voltage tap from the output of variable current drivers 411, 412 is switchably connected via switch 413 to pre-amplifier 414, as shown. Variable bias current drivers 411, 412 provide bias current necessary for operation of the magnetoresistive sensors. Pre-amplifier 414 senses voltage changes at the output of bias current drivers 411, 412, the voltage changes resulting from the bias current flowing in the magnetoresistive element. These voltages are amplified and input to channel 302.

Multiplexers 421 and 422 operate in response to a head select signal 423 from file controller 301 to select one of the transducer heads in disk drive 100 for a read or write operation. In response to head select signal 423, multiplexer 421 couples the output of servo element bias current driver 411 to lead wire 406 corresponding to the selected head, while multiplexer 422 couples the output of data element bias current driver 412 with lead wire 407 corresponding to the selected head. Bias current driver 411 will then drive an appropriate bias current through servo read element 402 of the selected head, while bias current driver 412 drives an appropriate bias current through data read element 403 of the same head.

Switch 413 operates in response to a control signal 313 from servo processor 303. When transducer head 109 passes over one of track centering embedded servo patterns 204, 205, control signal 313 causes switch 413 to couple the output of servo element bias current driver 411 to the input of pre-amplifier 414. Pre-amp 414 will then sense voltage changes from servo element 402 only. When transducer head 109 passes over data during a read operation, control signal 313 causes switch 413 to couple the output of data element bias current driver 412 to the input of pre-amp 414. Pre-amp 414 will then sense only data element 403. Typically, the wider servo element 402 is needed only for the track centering portion 204, 205 of embedded servo patterns 202, 203; the narrower data element 403 may be used to read the synchronization pattern or the track identifying portion.

It is known that optimum bias current level for a magnetoresistive sensor is dependent on many factors, particularly the dimensions of the sensor, and that the optimum current may vary from one head to another within the same disk drive. Because elements 402 and 403 are of different dimensions, the optimum bias current will likely be different for the two elements. It is preferred that current drivers 411, 412 provide a selectable bias current in response to a selection signal (not shown) from file controller 301. The optimum bias current can be adjusted by any of various techniques, such as calculation from known design parameters, or by individual head calibration, as disclosed in U.S. Pat. No. 5,412,518 to Christner et al., herein incorporated by reference.

In the preferred embodiment, separate bias current drivers 411, 412 are used to drive separate bias currents through read elements 402, 403, respectively. The use of separate drivers is preferred because a single switched driver would possibly create additional noise. Furthermore, it has been observed that magnetoresistive elements are thermally sensitive, and that switching bias current on and off as the element passes a servo sector on the disk surface may cause thermal fluctuations in the output of the element. These fluctuations would likely be more severe in the servo read element, which would be on for a shorter period of time.

However, in an alternative embodiment, it would be possible to construct the amplifier circuit using a switched bias current driver. Such an arrangement would reduce drive circuitry and lower the total amount of current flowing in the head, achieving a small power saving. This alternative embodiment is shown in FIG. 4B.

In the embodiment of FIG. 4B, most elements perform the same function as explained above with respect to FIG. 4A. However, instead of two bias current drivers 411, 412 as shown in FIG. 4A, a single variable bias current driver 431 is used to drive both read elements 402, 403. Pre-amp 414 is coupled to the output of bias current driver 431. This output is switchably connected via switch 432 to the input of either multiplexer 421 or 422. Control signal 313 from servo processor 303 operates switch 432, so that multiplexer 421 is coupled to bias current driver 431 and multiplexer 422 is decoupled when head 109 passes over one of track centering embedded servo patterns 204, 205. In this case, pre-amp 414 will sense voltage changes from servo element 402 only. When head 109 passes over data, multiplexer 421 is decoupled and multiplexer 422 is coupled to bias current driver 431, causing pre-amp 414 to sense voltage changes from data element 403 only.

Because elements 402 and 403 are of different dimensions and will probably have differing optimum bias currents, the bias current being output by bias current driver 432 should be dependent not only on the head selected, but on the position of the head (i.e., whether the head is reading servo or data signals). Control signal 313 is also input to the bias current selection circuitry (not shown) so that an appropriate bias current can be selected.

Figure 4C:
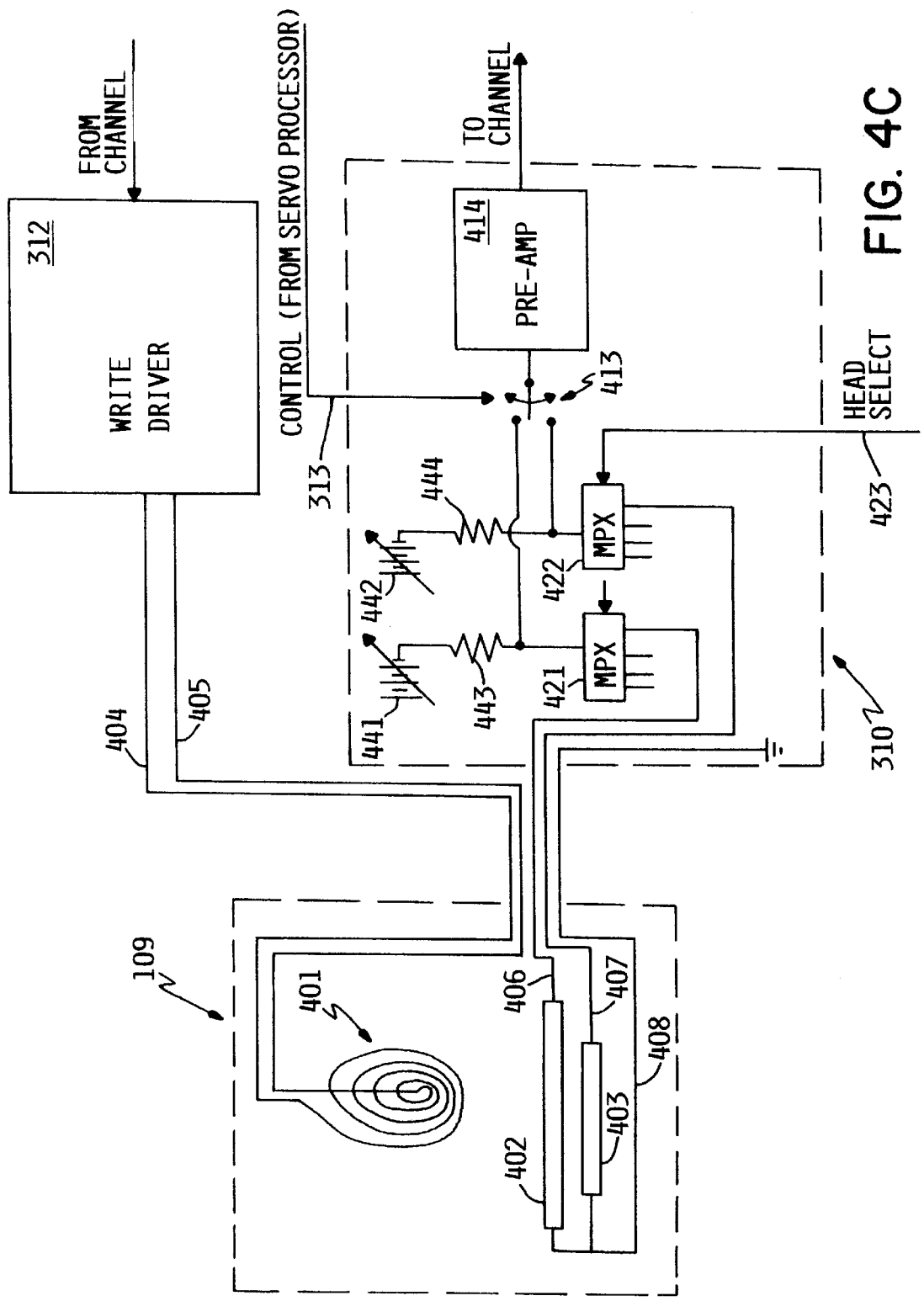

In a further alternative embodiment, it would be possible to employ variable voltage sources 441, 442 in place of variable bias current drivers 411, 412, as shown in FIG. 4C. The variable voltage sources would be connected to respective resistors 443, 444, and taps for pre-amp 414 would be taken at the output of the resistors and input to multiplexers 421, 422. The result is a voltage divider circuit in which one of the resistances (i.e., the magnetoresistive element) is variable. Pre-amp 414 would sense the variation in voltage caused by the variable resistance of the magnetoresistive element. A similar modification could be made to the circuit of FIG. 4B.

It will be understood by those skilled in the art that the circuitry of FIGS. 3, 4A 4B and 4C is shown in greatly simplified form for ease of illustration. It will further be understood that switches 413, 432 and multiplexers 421, 422 are in reality circuits which uses semiconductor devices. It will also be understood that while only one transducer head 109 is shown in FIGS. 3, 4A 4B and 4C, disk drive 100 preferably contains multiple heads, one for each disk surface, these heads being switchably connected to drivers 411, 412, 431 and pre-amp 414 by the multiplexers.

Figure 5:
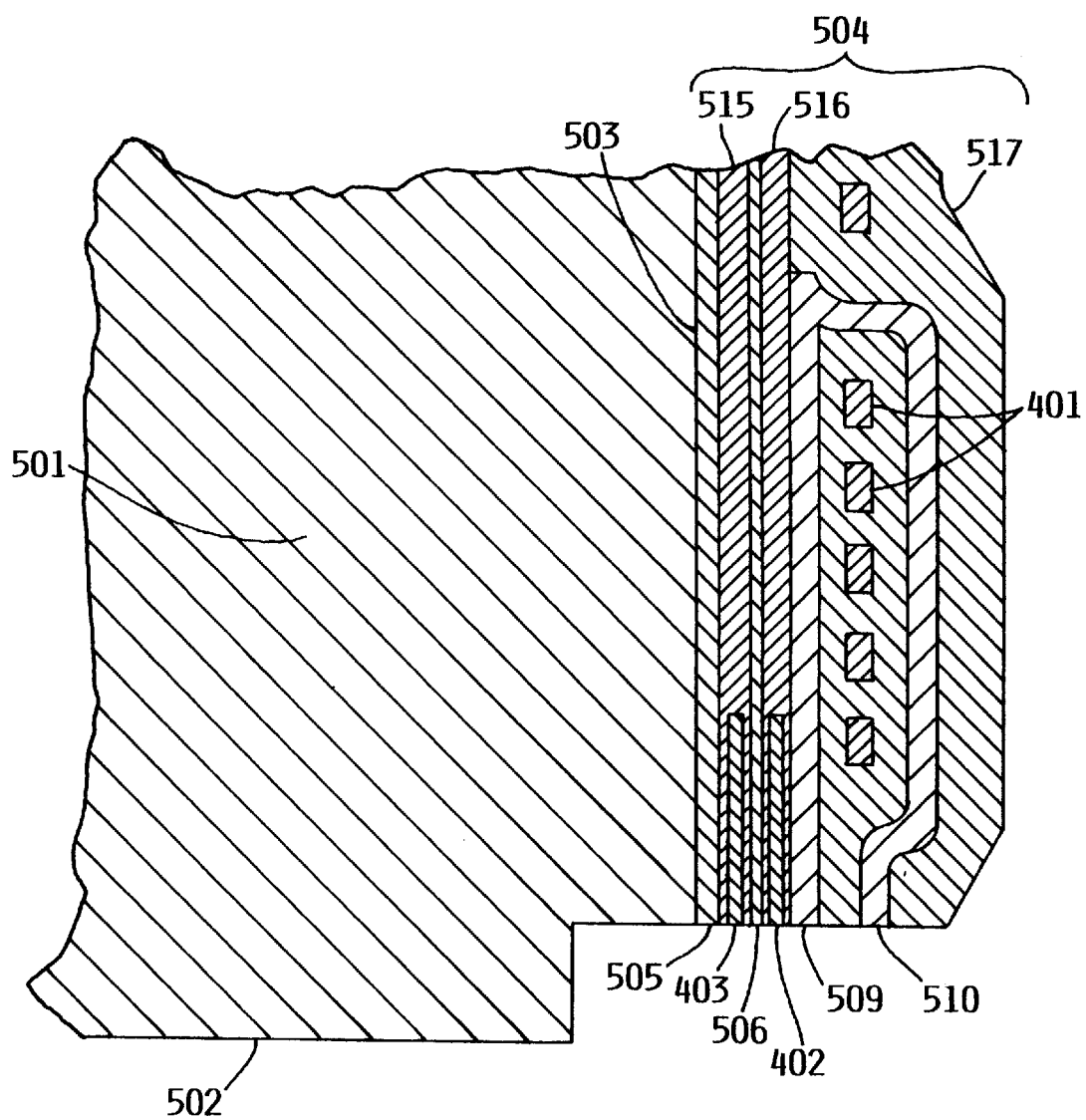
FIG. 5 is a sectional view of a portion of a transducer head having dual magnetoresistive transducer elements, according to the preferred embodiment.
Figure 6:
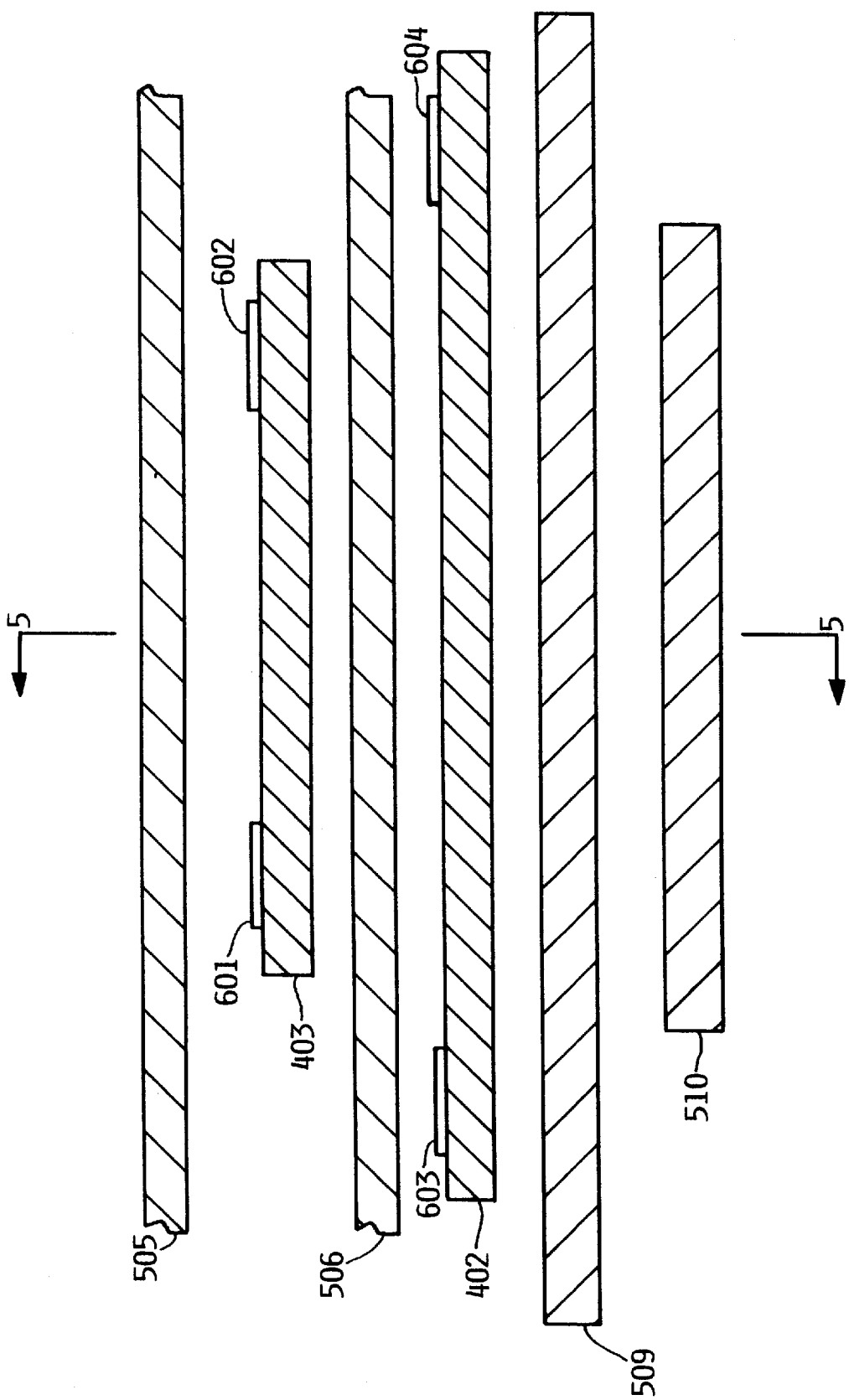
FIG. 6 is a bottom view of a portion of a transducer head having dual magnetoresistive transducer elements, according to the preferred embodiment.

FIG. 5 is a sectional view of a portion of transducer head assembly 109, in a plane perpendicular to the surface of disk 101 and parallel to the longitudinal axis of the transducer head. FIG. 5 shows the trailing end of head 109 with respect to airflow. FIG. 6 is a bottom view of a similar portion of the transducer head assembly 109. The section plane of FIG. 5 is shown in FIG. 6. Both views show the orientation of different transducer layers in accordance with the preferred embodiment.

Slider body 501 (only a portion of which is shown) is a ceramic block having an air bearing surface 502 facing the recording surface of disk 101. Transducer layers 504 are attached to rear surface 503 of slider body 501. A first magnetoresistive shield layer 505 is immediately adjacent slider body 501. A second magnetoresistive shield layer 506 lies between magnetoresistive elements 402 and 403. Conductive leads 601–604 contact each transducer element 402, 403 and the ends thereof, and extend upwards toward the upper surface of slider body 501, where they are attached to lead wires 406–408 at lead wire connection points (not shown). Elements 402 and 403 are embedded in ceramic layers 516, and 515, respectively, along with conductive leads 601–604. First thin film inductive pole tip 509 is adjacent ceramic layer 516 and also acts as a shield for element 402. Second pole tip 510 forms a recording gap with tip 509. Thin film inductive windings 401 surround the upper portion of pole tip 510 to produce a magnetic flux when energized by write driver 312. Thin film windings 401 and pole tips 509, 510 are embedded in ceramic layer 517.

The transducer head may also include soft magnetic adjacent layers (SALs) adjacent each of magnetoresistive elements 402, 403, for maintaining the magnetic orientation within the elements. These SALs have been omitted from FIGS. 5 and 6 for clarity of illustration.

Preferably, transducer head assembly 109 is constructed by successive deposition of various layers using conventional techniques. The transducer head of the preferred embodiment employs additional layers (hence requiring several additional process steps to manufacture), but does not otherwise require new processes or materials unknown to those skilled in the art. Specifically, slider body 501 may be a suitable ceramic such as titanium carbide N58; shield layers 505, 506 and pole tips 509, 510 a NiFe permalloy; ceramic layers 515–517 SiO, inductive windings 401 and conductive leads 601–604 are Al or some suitable highly conductive material, and magnetoresistive elements 402, 403 an alloy of Ta or Ni exhibiting suitable magnetoresistive properties. These materials are only cited as examples, and many suitable alternatives could be used as are known in the art.

Preferably, shield layer 506 lies between the two magnetoresistive elements 402, 403 to provide additional de-coupling. However, in an alternative embodiment it would be possible to construct transducer layers 504 without shield 506, reducing the number of process steps.

The widths of the magnetoresistive elements in a dimension parallel to the disk surface and parallel to the rear surface of the slider body (i.e., perpendicular to the longitudinal axis of the slider body, which corresponds approximately with a tangent to the track centerline) are critical dimensions. As explained above, a narrower element will have difficulty distinguishing the servo patterns, while a wider element may pick up interfering noise at the edges of a track. In the preferred embodiment, the write transducer (width of pole tip 510) is approximately 80–90% of the track pitch in order to avoid interference with adjacent tracks. In this embodiment, servo read element 402 is approximately the same width as the track pitch, i.e., wider than the write transducer. Element 402 is used for reading servo patterns, but is not normally used to read data. A width corresponding to the track pitch is believed optimal for reading the track centering servo pattern. Element 403, which is used for reading data recorded in a track, is preferably about 50%–70% as wide as the track pitch. The narrower element 403 avoids interfering noise at the edge of the track, but is still sufficiently sensitive to read data. It is believed that farther narrowing of element 403 would reduce the sensitivity of the element without sufficiently reducing the noise.

The above dimensions are approximate and are based upon current materials and recording technology parameters. It will be understood that future changes in recording technology may alter these percentages. For example, if improvements in magnetoresistive materials significantly increase the sensitivity of element 403, the optimal width of the element may drop in order achieve further reduction in interfering noise. Conversely, increases in linear data density may require a wider element 403 to provide increased sensitivity.

Figure 7:
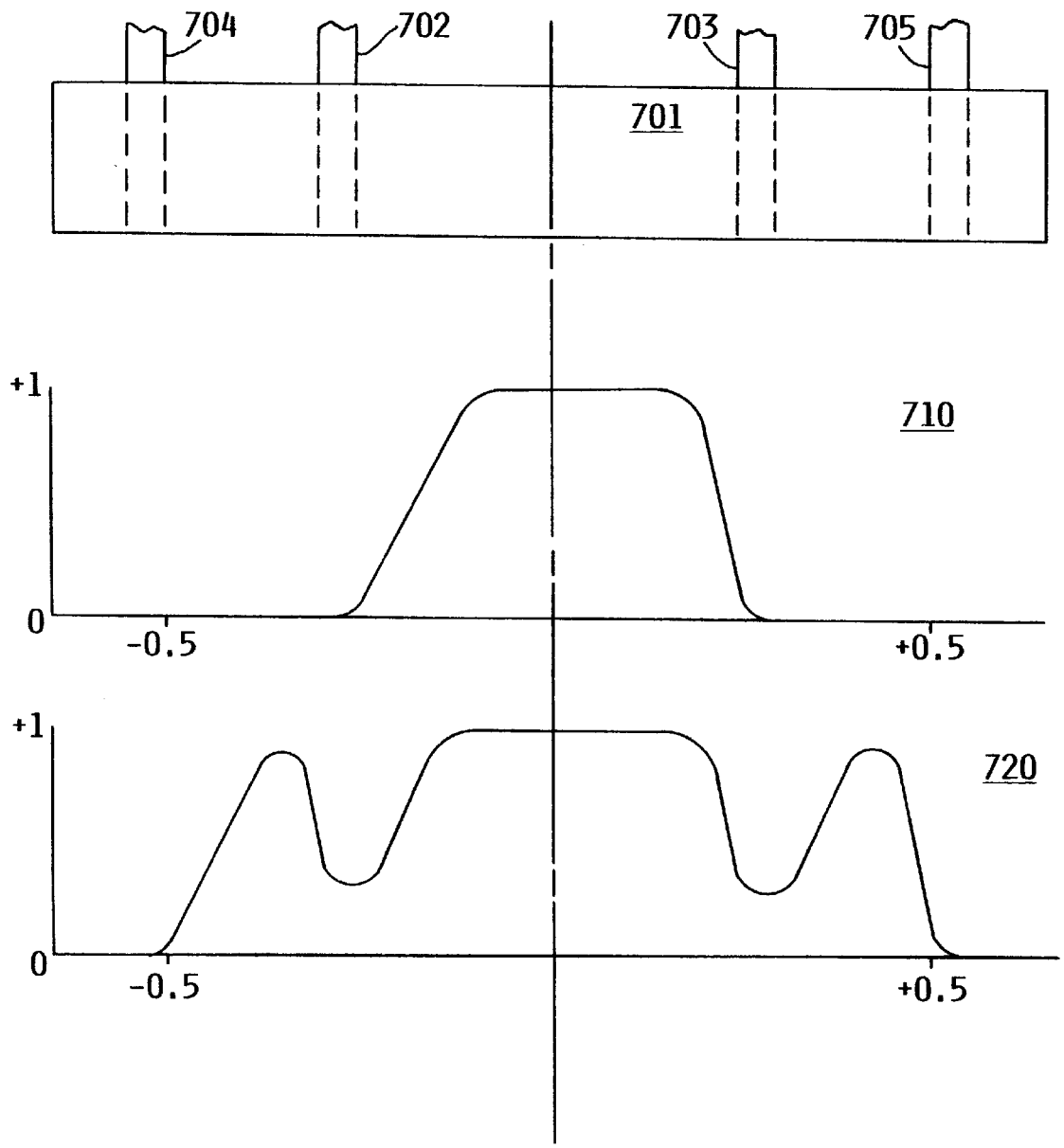
FIG. 7 shows a predicted read sensitivity profile of a prior art combined servo/data read element.

FIG. 7 shows a predicted response characteristic of the prior art combined servo/data read element, similar to that described in JA-4-205808 (1992). In the upper part of the figure is shown magnetoresistive read element 701, having attached thereto one pair of leads 702, 703 for reading data and another pair of leads 704, 705 for reading servo patterns.

When data is read, a bias current is driven through the central part of element 701 between leads 702 and 703. Read sensitivity profile 710 shows a typical response characteristic of the portion of element 701 between leads 702 and 703, when reading data. Sensitivity profile 710 illustrates a generally flat (constant) response to magnetization of the disk surface being read, except near leads 702 and 703. It will be observed that the response characteristic is somewhat asymmetrical near the leads, but this is generally not considered a problem when reading data, so long as the element is properly centered on the track.

When servo patterns are read, a bias current is driven through a wider portion of element 701, between leads 704 and 705. In the latter instance, bias current crosses leads 702 and 703. Because the resistance of the leads is substantially lower than that of the element, most of the current flowing in the element between leads 704 and 705 will flow through leads 702 and 703, rather than through the portion of element 701 directly adjacent leads 702 and 703. The non-transducing character of these leads causes substantial discontinuities in the response characteristic of the element. The read sensitivity profile 720 when reading servo patterns is shown in the lower part of FIG. 7. As can be seen, normal maximum response of the element will be exhibited in disjoint regions between the various leads. Near the leads, the response of the element is considerably distorted. Sensitivity profiles 710, 720 are intended to be illustrative only; they are not necessarily exact representations of response, and particularly of the distortion caused by leads 702 and 703. The exact shape of the profiles will depend upon the dimensions of the element and leads and other factors.

Figure 8:
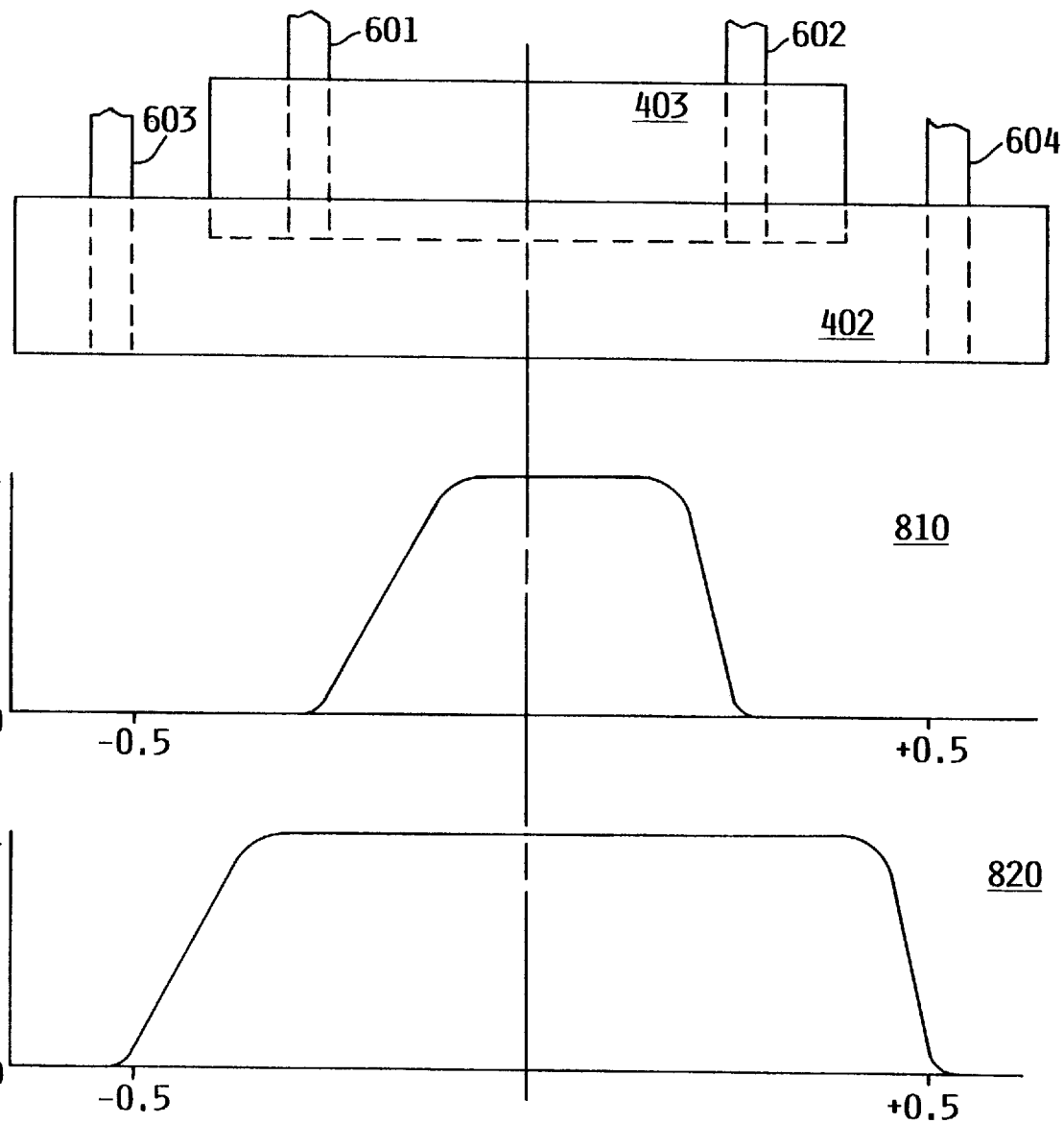
FIG. 8 shows a predicted read sensitivity profile of a transducer head having dual magneto-resistive transducer elements, according to the preferred embodiment.

FIG. 8 shows a predicted response characteristic of applicants' dual read element design. In the upper part of FIG. 8 is represented the dual elements 402 and 403, used for reading servo and data patterns, respectively. These elements are superimposed on leads 601–604. The elements are shown vertically offset in FIG. 8 for ease of illustration only, it being understood that in reality the elements, viewed from the rear, would overlap each other.

When data is read, a bias current is driven through element 403, resulting in read sensitivity profile 810. As can be seen, sensitivity profile 810 is similar to sensitivity profile 710 produced for the prior art design.

When servo patterns are read, a bias current is driven through element 402, resulting in read sensitivity profile 820. Unlike the prior art profile 720 of FIG. 7, sensitivity profile 820 exhibits a fairly uniform response, except for the normally asymmetric response near the two leads 603, 604. Because applicants' design produces a more uniform sensitivity profile 820 than the prior art design, a more accurate position error signal is possible, enabling more accurate positioning of the actuator.

Because small positioning discrepancies are introduced by the distance along the longitudinal axis of the slider between servo read element 402 and either write element or data read element 403, it is preferable that servo read element 402 be positioned between data read element 403 and the write element. It is further usually preferable to place the inductive write element as the rear-most element. However, it would alternatively be possible to switch the positions of the various elements.

Preferably, the transducer heads are calibrated after assembly into disk drive 100 to account for any radial offset in the position of the heads. As explained in commonly owned copending U.S. patent application Ser. No. 08/392,276 to Dana H. Brown et al., filed Feb. 22, 1995, a radial offset which varies with the angular position of actuator 105 is introduced by virtue of the distance between transducing elements. Additionally, each individual head varies slightly in its dimensions, introducing further offset. Heads are preferably calibrated individually. Preferably, the radial offset between servo read element 402 and write transducer pole tip 510 is determined using the method similar to that explained in the Brown patent application. I.e., a servo writing apparatus capable of accurately locating the actuator positions the transducer head to write a servo pattern at the outer edge of disk surface 102 while moving the transducer head outward in overlapping steps. The transducer head is then positioned by the servo writer to read the pattern just written using servo read element 402, and the offset from track center (magnitude of position error signal) saved. The servo writing apparatus then positions the transducer head to write another servo pattern at the outer edge of disk surface 102 while moving the transducer inward in overlapping steps. The transducer is then positioned by the servo apparatus to read the second servo pattern using the servo read element, and the offset from track center saved. The two position error readings are then averaged to produce the calibrated offset at the outer edge of disk surface 102. The process is repeated at the inner edge of disk surface 102. The radial offset at any position between the outer edge and the inner edge can then be determined by interpolation.

The above described procedure can be extended to further determine the radial offset between servo read element 402 and data read element 403. This can be accomplished by reading the servo patterns with both the servo read element 402 and the data read element 403 while the head is positioned using the servo writing apparatus. The patterns must be read on different revolutions of the disk, because unreliable readings are likely to be generated if both elements are attempting to read simultaneously. The difference in the position error signals from the two elements is the amount of radial offset. As in the case of the write transducer, the amount of radial offset between the two read elements should be measured at both the inner edge of the disk surface and the outer edge of the disk surface. It can then be determined by interpolation for positions between the inner and outer edges. The calibrated offset values at the disk edges would be stored in a reserved area of a disk surface for use during operation of disk drive 100.

Although the above described method is preferred for accurate determination of the radial offset and positioning of the actuator during data read and write operations, it will be understood that this method is not necessarily the only method of calibrating the heads. Alternative calibration techniques could be used, or radial offset could be estimated without calibration from the approximate known dimensions and geometry of the various elements. Alternatively, it may be possible to position the actuator without compensating for radial offset.

In the preferred embodiment, servo read element is approximately as wide as the track pitch. This width was chosen for optimal interpretation of conventional servo patterns used for locating the track centerline. However, alternative widths are possible, particularly in conjunction with different servo patterns. For example, a servo read element which is substantially wider than the track pitch could be used in conjunction with an appropriate servo pattern.

In the discussion above, the critical "width" of elements 402, 403 is the distance that the bias current must travel through the elements, i.e., the width of element 402 is approximately the distance between conductive lead pairs 603 and 604, which the width of element 403 is approximately the distance between conductive lead pairs 601 and 602. This portion of the element is the active portion which is used for sensing magnetic patterns. However, it is common in the art to manufacture magnetoresistive elements, in which the magnetoresistive materials extend beyond the conductive leads at both ends. These extensions tend to reduce distortion at the ends of the elements. For manufacturing convenience or other reasons, it would be possible to construct elements 402 and 403 such that the width of magnetoresistive material is the same for both elements, but the conductive leads are positioned at different distances from each other, effectively making two elements of different widths.

As explained above, the wider of the two magnetoresistive read elements is not normally used for reading data, and is normally only used to read servo patterns. Avoiding use of the wider element when reading data reduces noise at the fringes of the tracks. However, it may alternatively be useful to employ the wider element to read data as part of error recovery procedures. I.e., if the narrow element normally used for reading has already attempted to read a particular data sector and has been unsuccessful (e.g., as a result of surface defect, magnetic anomaly, etc.) an error recovery procedure may attempt to read the same sector using the wider element normally used only for servo patterns. It is possible that in some circumstances, the wider element will be able to read data which the narrower element was not.

In the preferred embodiment, a transducer head having dual magnetoresistive read elements is used to access magnetically recorded data in a rotating magnetic hard disk drive. However, such a head could alternatively be used in other environments in which data is magnetically recorded, and servo patterns are used to position the transducer. For example, a dual read element transducer as described herein could be used to access data in a magnetic floppy disk drive, or to access data recorded on magnetic tape.

In the description above, certain components such as the transducer head assembly have sometimes been referred to as having "top" or "bottom" surfaces or portions. It should be understood that these designations are used only for ease of reference and are consistent with the normal orientation used in illustrating the art. The use of these terms is not meant to imply that the present invention requires a slider or any other part to be oriented in any particular manner with respect to the earth. Typically, sliders are mounted on opposed disk surfaces, so that the "bottom" of one slider is actually facing upwards. The entire disk assembly could just as easily be mounted with the disks in a vertical plane.

Although a specific embodiment of the invention has been disclosed along with certain alternatives, it will be recognized by those skilled in the art that additional variations in form and detail may be made within the scope of the following claims.

What is claimed is:

1. A rotating disk data storage device, comprising:

a disk drive base;

at least one rotatable mounted disk for recording data in a plurality of tracks recorded on a surface of said at least one rotatable mounted disk, said at least one rotatably mounted disk having recorded thereon a plurality of annularly spaced embedded servo patterns for identifying the locations of said plurality of tracks;

a movable actuator supporting at least one transducer head, said transducer head comprising:
  (a) a first magnetoresistive read element for reading servo information on said disk, said first magnetoresistive read element having a first width in a dimension parallel to said disk surface and substantially perpendicular to said tracks,
  (b) a second magnetoresistive read element for reading data recorded on said disk, said second magnetoresistive read element having a second width in said dimension parallel to said disk surface and substantially perpendicular to said tracks, said second width being less than said first width,
  (c) at least one electrically insulating layer between said first magnetoresistive read element and said second magnetoresistive read element, and
  (d) a thin-film inductive write apparatus, wherein said thin-film inductive write apparatus has a third width in said dimension parallel to said disk surface and substantially perpendicular to said tracks, said third width being less than said first width and greater than said second width; and signal sensing apparatus electrically coupled to said first magnetoresistive read element and said second magnetoresistive read element, said signal sensing apparatus selectively sensing said first magnetoresistive read element to generate a position error signal from said angularly spaced embedded servo patterns, and selectively sensing said second magnetoresistive read element to read data recorded on said tracks.

2. The rotating disk data storage device of claim 1, wherein said first read element, said second read element, said insulating layer, and said thin-film inductive write apparatus, are deposited as a series of successive layers on the rear surface of an air-bearing slider.

3. The rotating disk data storage device of claim 1, wherein said signal sensing apparatus is electrically connected to said first and second magnetoresistive read elements with three electrically conductive wires, said three electrically conductive wires comprising (a) a first element wire connected to a first end of said first magnetoresistive read element; (b) a second element wire connected to a first end of said second magnetoresistive read element; and (c) a common ground wire connected to a second end of said first magnetoresistive read element and connected to a second end of said second magnetoresistive read element.

4. A rotating disk data storage device, comprising:

a disk drive base;

at least one rotatably mounted disk for recording data in a plurality of tracks recorded on a surface of said at least one rotatably mounted disk, said at least one rotatably mounted disk having recorded thereon a plurality of angularly spaced embedded servo patterns for identifying the locations of said plurality of tracks;

a movable actuator supporting at least one transducer head, said transducer head comprising:
  (a) a first magnetoresistive read element for reading servo information on said disk, said first magnetoresistive read element having a first width in a dimension parallel to said disk surface and substantially perpendicular to said tracks,
  (b) a second magnetoresistive read element for reading data recorded on said disk, said second magnetoresistive read element having a second width in said dimension parallel to said disk surface and substantially perpendicular to said tracks, said second width being less than said first width, wherein at least a portion of said first magnetoresistive read element overlaps at least a portion of said second magnetoresistive read element in a dimension parallel to said disk surface and substantially perpendicular to said tracks, and
  (c) at least one electrically insulating layer between said first magnetoresistive read element and said second magnetoresistive read element; and signal sensing apparatus electrically coupled to said first magnetoresistive read element and said second magnetoresistive read element, said signal sensing apparatus selectively sensing said first magnetoresistive read element to generate a position error signal from said angularly spaced embedded servo patterns, and selectively sensing said second magnetoresistive read element to read data recorded on said tracks.

5. The rotating disk data storage device of claim 4, wherein said transducer head further comprises:
  (d) a shield layer between said first magnetoresistive read element and said second magnetoresistive read element.

6. The rotating disk data storage device of claim 4, wherein said signal sensing apparatus comprises a variable bias current source circuit, said variable bias current source circuit driving a first electrical bias current through said first magnetoresistive read element, and a second electrical bias current through said second magnetoresistive read element, said first current being of different magnitude from said second current.

7. The rotating disk data storage device of claim 4, wherein said transducer head further comprises:
  (d) a thin-film inductive write apparatus.

8. The rotating disk data storage device of claim 7, wherein said first read element, said second read element, said insulating layer, and said thin-film inductive write apparatus, are deposited as a series of successive layers on the rear surface of an air-bearing slider.

9. A transducer head for a data storage device, said transducer head for mounting on a movable actuator to access data magnetically recorded in a track on a recording surface of a magnetic recording medium, said recording medium having recorded thereon a plurality of servo patterns interleaved at intervals with said data for identifying the location of said track, said transducer head comprising:

a slider body for supporting a transducer in close proximity with said recording surface;

a first magnetoresistive read element for reading servo information on said recording surface, said first magnetoresistive read element having a first width in a dimension parallel to said recording surface and substantially perpendicular to said track, a second magnetoresistive read element for reading data recorded on said recording surface, said second magnetoresistive read element having a second width in said dimension parallel to said recording surface and substantially perpendicular to said track, said second width being less than said first width, wherein at least a portion of said first magnetoresistive read element overlaps at least a portion of said second magnetoresistive read element in a dimension parallel to said recording surface and substantially perpendicular to said track;

at least one insulating layer between said first magnetoresistive read element and said second magnetoresistive read element; and a plurality of lead wire connections for electrically connecting said first and second magnetoresistive read elements to signal sensing apparatus, said plurality of lead wire connections enabling said signal sensing apparatus to selectively sense said first magnetoresistive read element to generate a position error signal from said servo patterns, and to selectively sense said second magnetoresistive read element to read data recorded on said track.

10. The transducer head for a data storage device of claim 9, wherein said transducer head further comprises a shield layer between said first magnetoresistive read element and said second magnetoresistive read element.

11. The transducer head for a data storage device of claim 9, wherein said slider body is an air-bearing slider designed for incorporation into a rotating magnetic hard disk drive.

12. The transducer head for a data storage device of claim 9, wherein said transducer head further comprises a thin-film inductive write apparatus.

13. The transducer head for a data storage device of claim 12, wherein said first read element, said second read element, said insulating layer, and said thin-film inductive write apparatus, are deposited as a series of successive layers on the rear surface of said slider body.

14. A transducer head for a data storage device, said transducer head for mounting on a movable actuator to access data magnetically recorded in a track on a recording surface of a magnetic recording medium, said recording medium having recorded thereon a plurality of servo patterns interleaved at intervals with said data for identifying the location of said track, said transducer head comprising:

a slider body for supporting a transducer in close proximity with said recording surface;

a first magnetoresistive read element for reading servo information on said recording surface, said first magnetoresistive read element having a first width in a dimension parallel to said recording surface and substantially perpendicular to said track, a second magnetoresistive read element for reading data recorded on said recording surface, said second magnetoresistive read element having a second width in said dimension parallel to said recording surface and substantially perpendicular to said track, said second width being less than said first width;

at least one insulating layer between said first magnetoresistive read element and said second magnetoresistive read element;

a thin-film inductive write apparatus, wherein said thin-film inductive write apparatus has a third width in said dimension parallel to said recording surface and substantially perpendicular to said tracks, said third width being less than said first width and greater than said second width; and a plurality of lead wire connections for electrically connecting said first and second magnetoresistive read elements to signal sensing apparatus, said plurality of lead wire connections enabling said signal sensing apparatus to selectively sense said first magnetoresistive read element to generate a position error signal from said servo patterns, and to selectively sense said second magnetoresistive read element to read data recorded on said track.

15. A rotating disk data storage device, comprising:

a disk drive base;

at least one rotatably mounted disk for recording data in a plurality of tracks recorded on a surface of said at least one rotatably mounted disk, said at least one rotatably mounted disk having recorded thereon a plurality of angularly spaced embedded servo patterns for identifying the locations of said plurality of tracks;

a movable actuator supporting at least one transducer head, said transducer head comprising:

(a) a first magnetoresistive read element for reading servo information on said disk, said first magnetoresistive read element having a first width in a dimension parallel to said disk surface and substantially perpendicular to said tracks, (b) a second magnetoresistive read element for reading data recorded on said disk, said second magnetoresistive read element having a second width in said dimension parallel to said disk surface and substantially perpendicular to said tracks, said second width being less than said first width, and (c) at least one electrically insulating layer between said first magnetoresistive read element and said second magnetoresistive read element; and signal sensing apparatus electrically coupled to said first magnetoresistive read element and said second magnetoresistive read element, said signal sensing apparatus selectively sensing said first magnetoresistive read element to generate a position error signal from said angularly spaced embedded servo patterns, and selectively sensing said second magnetoresistive read element to read data recorded on said tracks, wherein said signal sensing apparatus is electrically connected to said first and second magnetoresistive read elements with three electrically conductive wires, said three electrically conductive wires comprising: (a) a first element wire connected to a first end of said first magnetoresistive read element; (b) a second element wire connected to a first end of said second magnetoresistive read element; and (c) a common ground wire connected to a second end of said first magnetoresistive read element and connected to a second end of said second magnetoresistive read element.

16. The rotating disk data storage device of claim 15, wherein said signal sensing apparatus comprises variable bias current source circuit, said variable bias current source circuit driving a first electrical bias current through said first magnetoresistive read element, and a second electrical bias current through said second magneto-resistive read element, said first current being of different magnitude from said second current.

17. The rotating disk data storage device of claim 15, wherein said transducer head further comprises:

(d) a thin-film inductive write apparatus.

18. The rotating disk data storage device of claim 17, wherein said first read element, said second read element, said insulating layer, and said thin-film inductive write apparatus, are deposited as a series of successive layers on the rear surface of an air-bearing slider.

19. A transducer head for a data storage device, said transducer head for mounting on a movable actuator to access data magnetically recorded in a track on a recording surface of a magnetic recording medium, said recording medium having recorded thereon a plurality of servo patterns interleaved at intervals with said data for identifying the location of said track, said transducer head comprising:

a slider body for supporting a transducer in close proximity with said recording surface;

a first magnetoresistive read element for reading servo information on said recording surface, said first magnetoresistive read element having a first width in a dimension parallel to said recording surface and substantially perpendicular to said track, a second magnetoresistive read element for reading data recorded on said recording surface, said second magnetoresistive read element having a second width in said dimension parallel to said recording surface and substantially perpendicular to said track, said second width being less than said first width;

at least one insulating layer between said first magnetoresistive read element and said second magnetoresistive read element; and three lead wire connections for electrically connecting said first and second magnetoresistive read elements to signal sensing apparatus, said three lead wire connections enabling said signal sensing apparatus to selectively sense said first magnetoresistive read element to generate a position error signal from said servo patterns, and to selectively sense said second magnetoresistive read element to read data recorded on said track, said three lead wire connections comprising: (a) a first element lead wire connection electrically coupled to a first end of said first magnetoresistive read element; (b) a second element lead wire connection electrically coupled to a first end of said second magnetoresistive read element; and (c) a common ground lead wire connection electrically coupled to a second end of said first magnetoresistive read element and electrically coupled to a second end of said second magnetoresistive read element.

* * * * *

UNITED STATES PATENT AND TRADEMARK OFFICE
CERTIFICATE OF CORRECTION

PATENT NO. : 6,104,562
DATED : August 15, 2000
INVENTOR(S) : Hal Hjalmar Ottesen et al It is certified that error appears in the above-identified patent and that said Letters Patent is hereby corrected as shown below:

IN THE CLAIMS

Claim 1, Column 13, Line 19: "rotatable" should be -- rotatably --,

Claim 1, Column 13, Line 21: "rotatable" should be -- rotatably --,

Claim 1, Column 13, Line 23: "annularly" should be -- angularly --.

Signed and Sealed this

Tenth Day of April, 2001

*Attest:*

NICHOLAS P. GODICI

*Attesting Officer*   *Acting Director of the United States Patent and Trademark Office*